United States Patent [19]

Takagi

[11] Patent Number: 4,707,012

[45] Date of Patent: Nov. 17, 1987

[54] VACUUM HOLDER

[75] Inventor: Eizi Takagi, Ooita, Japan

[73] Assignee: Kabushiki Kaisha Toshiba, Kawasaki, Japan

[21] Appl. No.: 925,930

[22] Filed: Nov. 3, 1986

[30] Foreign Application Priority Data

Nov. 5, 1985 [JP] Japan .................................. 60-247510

[51] Int. Cl.⁴ .............................................. B66C 1/02
[52] U.S. Cl. ................................................. 294/64.1
[58] Field of Search .................... 294/64.1, 64.2, 64.3, 294/65; 414/627, 737, 744 A, 744 B, 752; 271/103, 106

[56] References Cited

U.S. PATENT DOCUMENTS 930,236 8/1909 Schacht .............................. 294/64.1
3,203,725 8/1965 Bitter ................................... 294/64.1

Primary Examiner—James B. Marbert
Attorney, Agent, or Firm—Finnegan, Henderson, Farabow, Garrett & Dunner

[57] ABSTRACT

A vacuum holder which comprises a chuck provided with a recess facing a silicon wafer, a suction pipe for sucking air in the vicinity of the recess, and four separately-positioned holes penetrating the chuck in communication with the inner space of the recess.

16 Claims, 3 Drawing Figures

VACUUM HOLDER

BACKGROUND OF THE INVENTION

This invention relates to a vacuum holder, and more particularly, to a vacuum holder adapted to pick up a plurality of semiconductor wafers one after another for their transfer.

FIG. 1 illustrates conventional vacuum holder 10. This vacuum holder 10 comprises cup-shaped chuck 12 and suction pipe 14 so as to pick up semiconductor wafer 16. Suction pipe 14 is fitted to chuck 12 in communication with the inner space of recess 18 and connected to a vacuum pump (not shown). In operation, the vacuum pump sucks air from the atmosphere near recess 18 through suction pipe 14, and chuck 12 is moved to cover semiconductor wafer 16. When chuck 12 is brought sufficiently close to semiconductor wafer 16, the air close to chuck 12 is decompressed, thereby causing semiconductor wafer 16 to be pulled close to chuck 12. Semiconductor wafer 16, thus picked up, is carried to a desired position together with vacuum holder 10 by means of a transport mechanism (not shown).

Conventional vacuum holder 10 has the drawbacks that semiconductor wafer 16 easily gets cracked when chuck 12 picks up semiconductor wafer 16. The occurrence of cracks can be minimized, for example, by decreasing the decompressing capacity of the vacuum pump. However, the decompressing capacity of the vacuum pump should necessarily be substantially reduced in order to reliably suppress the cracking of semiconductor wafer 16. However, if the decompressing capacity of the vacuum pump is excessively reduced, chuck 12 may fail to reliably pick up semiconductor vafer 16. Namely, some semiconductor wafers remain unpicked.

SUMMARY OF THE INVENTION

This invention has been accomplished in view of the above-mentioned circumstances and is intended to provide a vacuum holder reliably capable of picking up a semiconductor wafer without cracking it.

To attain the above-mentioned object, the present invention provides a vacuum holder which comprises a chuck having a recess facing a semiconductor wafer, a suction pipe for sucking air from the vicinity of the recess, and a plurality of openings separately disposed in the chuck, for permitting air to pass from outside into the inner space of the recess.

In the vacuum holder of this invention, external air can freely flow into the inner space of the recess without passing through the openings before the semiconductor wafer is picked up. During this period, therefore, the openings do not give rise to a decline in the suction force of the vacuum holder, thus enabling the suction force of the vacuum holder to effectively act on the semiconductor wafer. Thus a semiconductor wafer can be picked up with a sufficiently great suction force. When the chuck is placed on a semiconductor wafer, the outer air flows into the inner space of the recess through the openings to constitute part of air streams sucked into the suction pipe from the inner space of the recess. Consequently, the evacuating pressure prevailing in the inner space of the recess is reduced to a moderate level after the acquisition of a semiconductor wafer. Moreover, proper arrangement of the plural openings prevents evacuating pressures prevailing in the inner space of the recess from being unbalanced after the acquisition of a semiconductor wafer. As a result, no excess stresses appear in the semiconductor wafer. Namely, the vacuum holder of the present invention enables a semiconductor wafer to be picked up without being broken.

DETAILED DESCRIPTION OF THE PREFERRED EMBODIMENTS

Figure 1:
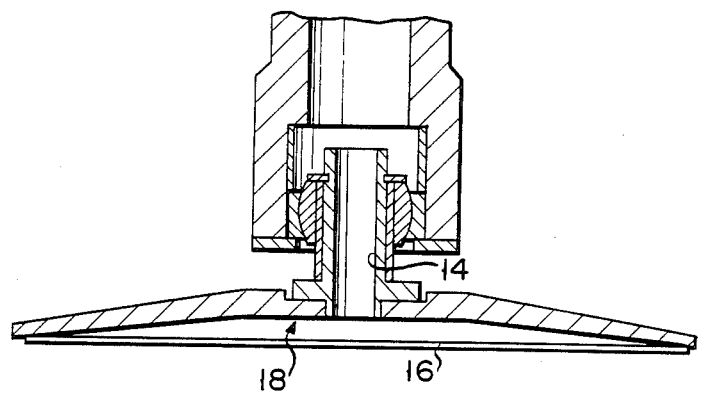
FIG. 1 is a sectional view of the conventional vacuum holder.
Figure 2:
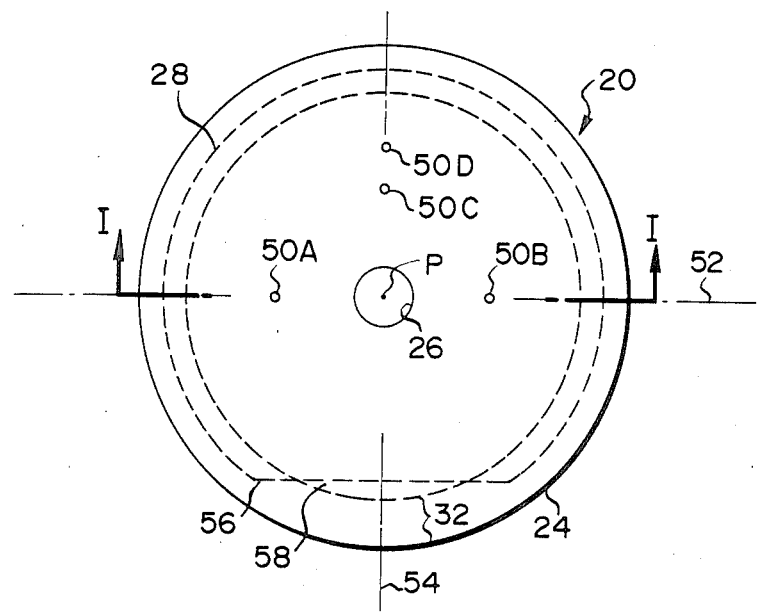
FIG. 2 is a fluoroscopic view of a vacuum holder embodying the present invention as taken from above.
Figure 3:
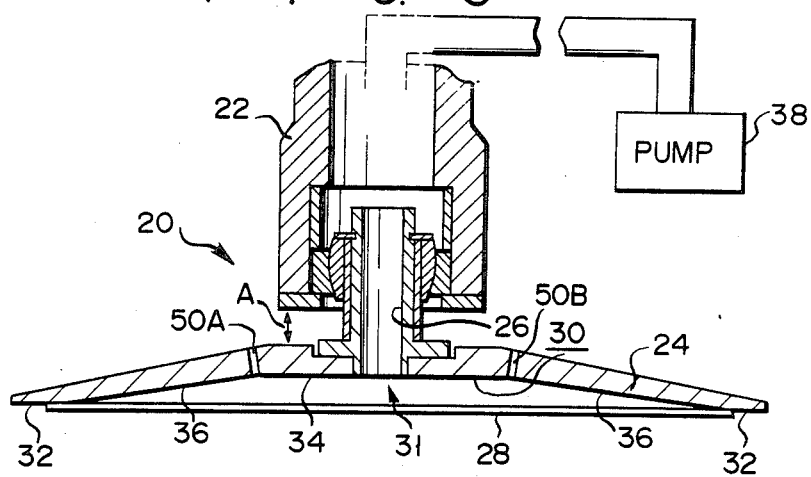
FIG. 3 is a sectional view of the vacuum holder of FIG. 2.

Description may now be made with reference to FIGS. 2 and 3 of a vacuum holder embodying the present invention. FIG. 2 is a fluoroscopic view of vacuum holder 20 of the invention as taken from above, FIG. 3 is a sectional view of vacuum holder 20 on line I—I of FIG. 2.

Vacuum holder 20 is applied when a plurality of semiconductor wafers are transported one after another. Holder 20 is coupled to air cylinder 22 and movable in the direction of arrow A as shown in FIG. 3. Air cylinder 22 is supported by a transport device (not shown), and is made to travel together with vacuum holder 20 through a section required for the transport of the semiconductor wafer. Vacuum holder 20 comprises substantially cup-shaped chuck 24 having an outer diameter of 129 mm and suction pipe 26 having an inner diameter of at least 8 mm in order to pick up silicon wafer 28 having a diameter of, for example, 5 inches. Chuck 24 and suction pipe 26 are made of aluminum. Chuck 24 comprises recess 30 to be opposed to silicon wafer 28 and flat portion 32 having a width of 18 mm and extending along the outer periphery of recess 30. Recess 30 comprises flat bottom 34 having a depth of 4.5 mm and a diameter of 42 mm and inclined portion 36 surrounding flat bottom 34 in contact with flat portion 32. As shown in FIG. 3, suction pipe 26 is fixed at the center of chuck 24 in communication with inner space 31 of recess 30. Vacuum pump 38 is started before the picking of silicon wafer 28, and draws in air from the open space lying near recess 30 through suction pipe 26.

Vacuum holder 20 further comprises 4 holes 50A, 50B, 50C, 50D formed in chuck 24 as shown in FIG. 2. Holes 50A-50D have a diameter of 2 mm and penetrate chuck 24 to communicate with the inner space of recess 30. Holes 50A, 50B are positioned at a distance of 30 mm from center P of suction pipe 26 on both sides thereof along straight line 52 (FIG. 2). Holes 50C, 50D are respectively positioned at distances of 30 mm and 40 mm from center of P of suctionn pipe 26 on one side thereof along straight line 54 intersecting straight line 52 at right angles (FIG. 2).

In transportation, silicon wafer 28 is placed, for example, on a susceptor (not shown). The transport device sets air cylinder 22 above silicon wafer 28 together with vacuum holder 20. At this time, holes 50A, 50B, 50C, 50D of vacuum holder 20 and orientation flat 56 assume the predetermined relative positions shown in FIG. 2. Namely, holes 50C, 50D face part of silicon wafer 28 on that side thereof where orientation flat 56 is not positioned.

Air cylinder 22 and vacuum holder 20 are lowered perpendicularly toward silicon wafer 28 to pick it up. Silicon wafer 28 is drawn close to chuck 24. At this time, window 58 shown in FIG. 2 is formed between orientation flat 56 and flat portions 32. After the acquisition of silicon wafer 28, external air flows into inner space 31 of recess 30 through holes 50A-50D, and constitutes part of the air which is drawn toward vcuum pump 38 from space 31. As a result, the vacuum pressure in space 31 is limited to a level of about 0.4 to 0.5 cm Hg. Silicon wafer 28 is held in position under the vacuum pressure, and transported to a prescribed point together with vacuum holder 20. After transit, silicon wafer 28 is released from chuck 24 when vacuum pump 38 is stopped.

According to the above-mentioned embodiment, the specific shapes and sizes of chuck 24 and suction pipe 26 enable a sufficient and uniform suction force to be applied to vacuum holder 20 in cooperation with the decompressing capacity of vacuum pump 38. Therefore, silicon wafer 28 is reliably drawn to chuck 24 due to its above-mentioned suction force.

After silicon wafer 28 is drawn to chuck 24, external air is carried into inner space 31 of recess 30 through holes 50A-50D. Therefore, the vacuum pressure prevailing in inner space 31 is limited to a level of about 0.4 to 0.5 cm Hg which prevents silicon wafer 28 from being subjected to excessive external stress.

Moreover, external air flows into inner space 31 of recess 30 through holes 50A-50D in well-balanced streams. Therefore, an unbalanced vacuum pressure is unlikely to be generated in the inner space of recess 30, thereby preventing silicon wafer 28 from falling off chuck 24, even under restricted vacuum pressure. Further, the possibility is suppressed that silicon wafer 28 undergoes different stresses due to the presence of an unbalanced vacuum pressure in inner space 31 of recess 30.

What is claimed is:

1. A vacuum holder for a semiconductor wafer comprising:
   a chuck having an exterior surface, an interior surface, an outer circumference, and a circumferential flat portion extending horizontally inward from the outer circumference;
   a recess, having a shape of a frustum, formed in the interior surface and bounded at a base by the circumferential flat portion;
   a suction pipe, joined to the interior surface, for drawing in air from the vicinity of said recess; and
   a plurality of opening means, each communicating from the exterior surface to the interior surface, for allowing external air to flow into an inner space of said recess, and for reducing an imbalance of vacuum pressure distribution in the recess when the vacuum holder picks up a semiconductor wafer having an orientation flat positioned radially inward from the circumferential flat portion.

2. A vacuum holder according to claim 1, wherein said plurality of opening means are so distributed that when said semiconductor wafer is drawn to the chuck, external air carried in through a window, created between the orientation flat of said semiconductor wafer and said chuck, flows into the inner space of said recess in well-balanced proportions to the external air carried in through said opening means.

3. A vacuum holder according to claim 2, wherein said plurality of opening means are holes.

4. A vacuum holder according to claim 3, wherein said suction pipe is fixed at the center of the chuck.

5. A vacuum holder according to claim 4, wherein said plurality of opening means are four holes having the same diameter.

6. A vacuum holder according to claim 5, wherein two of said holes are positioned one on each side of said suction pipe on a first straight line passing through the center of said suction pipe at an equal distance from said center, and the remaining two holes are both positioned on one side of said suction pipe on a second straight line passing through the center of said suction pipe and intersecting said first straight line at right angles.

7. A vacuum holder according to claim 6 wherein said chuck has an outer diameter of about 129 mm.

8. A vacuum holder according to claim 6 wherein said circumferential flat portion has a width of about 18 mm.

9. A vacuum holder according to claim 6 wherein said suction pipe has an inner diameter of about 8 mm.

10. A vacuum holder according to claim 6 wherein said recess has a flat bottom portion having a diameter of about 42 mm at a depth of about 4.5 mm from said circumferential flat portion.

11. A vacuum holder according to claim 6 wherein
    said chuck has an outer diameter of about 129 mm;
    said circumferential flat portion has a width of about 18 mm;
    said suction pipe has an inner diameter of about 8 mm;
    and a said recess has a flat bottom portion having a diameter of about 42 mm at a depth of about 4.5 mm from said circumferential flat portion.

12. A vacuum holder according to claim 6 wherein said two of said holes are each positioned 30 mm from the center of said suction pipe.

13. A vacuum holder according to claim 6 wherein one of said remaining two holes is positioned 30 mm from the center of said suction pipe and the other of said remaining two holes is positioned 40 mm from the center of said suction pipe.

14. A vacuum holder according to claim 13 wherein said two of said holes are each positioned 30 mm from the center of said suction pipe.

15. A vacuum holder according to claim 6 wherein said chuck contacts only a circumferential area of a semiconductor wafer.

16. A method for picking up a semiconductor wafer having a orientation flat comprising the steps of:
    orienting a vacuum holder;
    acquiring the semiconductor wafer;
    limiting vacuum pressure to 0.4 to 0.5 cm Hg in a space between the semiconductor wafer and an adjacent interior surface of the vacuum holder; and
    reducing an imbalance of vacuum pressure distribution in the space.

* * * * *